Oct. 10, 1961  H. E. DAY  3,004,138
WELDING METHOD AND CONSTRUCTION
Filed Sept. 29, 1958  2 Sheets-Sheet 1
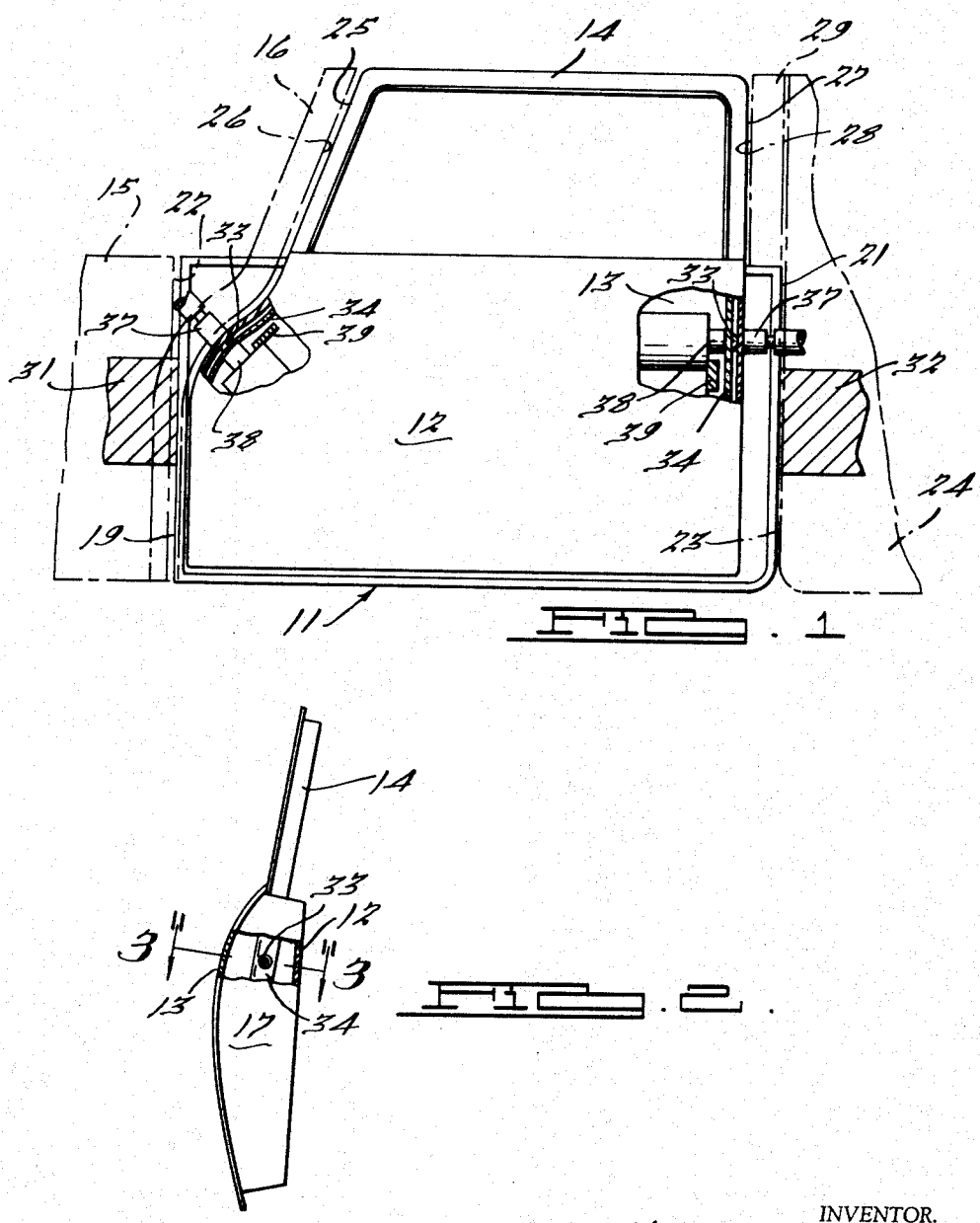
INVENTOR.
Harry E. Day
BY
Harness, Dickey & Pierce
ATTORNEYS.

Oct. 10, 1961   H. E. DAY   3,004,138
WELDING METHOD AND CONSTRUCTION
Filed Sept. 29, 1958   2 Sheets-Sheet 2
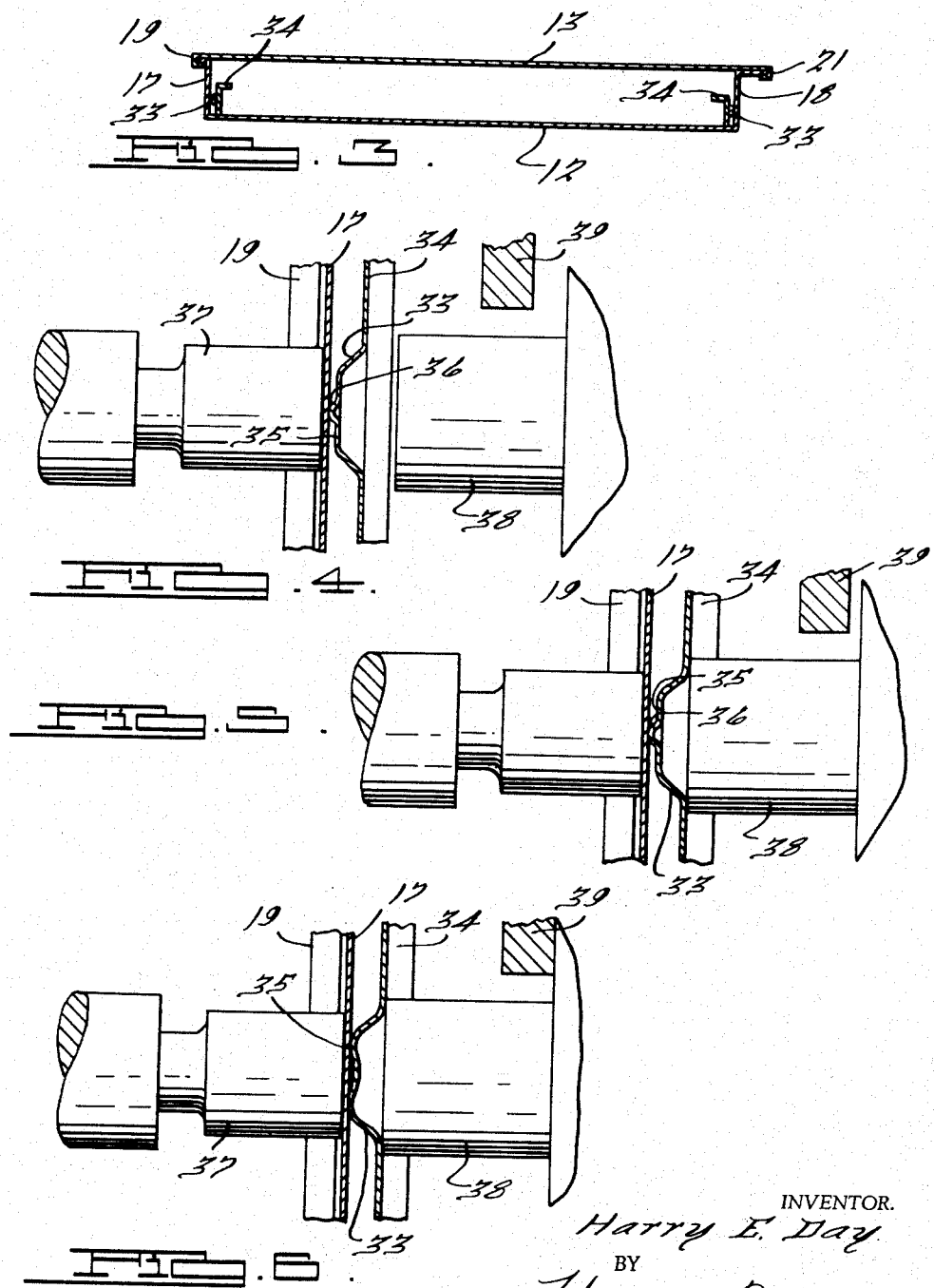
INVENTOR.
Harry E. Day.
BY
Harness, Dickey & Pierce
ATTORNEYS

United States Patent Office 3,004,138
Patented Oct. 10, 1961

3,004,138
WELDING METHOD AND CONSTRUCTION
Harry E. Day, Birmingham, Mich., assignor to Delta Welder Corporation, Detroit, Mich., a corporation of Michigan
Filed Sept. 29, 1958, Ser. No. 763,924
15 Claims. (Cl. 219—93)

This invention relates to welding techniques, and more particularly to arrangements for welding two parts together so as to have a predetermined spaced relationship.

In the mass production of many products such as automobile body parts, it is often necessary to weld two work-pieces together and at the same time provide a fixed spaced relationship between one of these parts and a third part, which relationship must remain constant for all the subassemblies in order to insure interchangeability during assembly. For example, in securing automobile window frames to door jamb panels, a fixed and predetermined relationship must exist between the frame and the front and rear edges of the door. Conventional methods of accomplishing this purpose, such as shimming or selective fitting, have been found to be unsatisfactory since they are of a time-consuming nature and require special attention.

It is an object of the invention to overcome the disadvantages of previously known methods for welding parts together with a given relationship, and to provide a simple, effective means and method for positively locating the parts at the same time they are welded together.

It is a further object of the invention to provide a novel and improved system for welding together two parts in a manner such that one of the parts will bear a fixed relationship to a third part, where the attainment of this fixed relationship requires a variable relationship between the parts which are welded together.

It is another object to provide a novel and improved construction and method of this nature, which eliminates the need for extraneous tools or equipment and requires no special attention on the part of the operator.

It is a further object to provide an improved method and construction of this character which is especially adapted for high production manufacturing and may be incorporated in automatic welding machines.

It is also an object to provide an improved welding construction having the above characteristics, in which the means for positively locating the workpieces in proper relationship is incorporated in the parts themselves.

It is a further object to provide an improved method by means of which parts may be automatically secured in proper relationship, this method employing accepted projection welding techniques and resulting in sound connections between the parts.

Other objects, features, and advantages of the present invention will become apparent from the subsequent description, taken in conjunction with the accompanying drawings.

In the drawings:

FIGURE 1 is a side elevational view of an automobile door, parts being broken away and enlarged for clarity, showing the relationship between the window frame and the door panels which may be effectuated by means of the present invention;

FIGURE 2 is a partly sectioned end elevational view of the door assembly shown in FIGURE 1;

FIGURE 3 is a cross-sectional plan view taken along the line 3—3 of FIGURE 2 and showing the manner in which the inner and outer door panels are assembled;

FIGURE 4 is a fragmentary cross-sectional view of portions of two parts which are to be welded in accordance with the invention, showing the novel embossment construction as well as the fixed and movable electrodes, with the movable electrode in its retracted position;

FIGURE 5 is a view similar to FIGURE 4 showing the movable electrode immediately after it has engaged one of the parts; and FIGURE 6 is a view similar to FIGURES 4 and 5 showing the movable electrode in its final position.

In general terms, the invention comprises a system by means of which two parts may be welded together so that one of the parts will bear a fixed relationship with respect to a third part, where the assembly is such that the attainment of this fixed relationship requires varying the distance between the welded parts. An example of such constructions is found in an automobile door assembly which comprises a lower portion made up of inner and outer panels, and an upper portion called a window frame or header, which surrounds the window. Because of modern day automobile design, it is required that the header, which is secured to the jamb portions of the inner panel, bear a fixed relationship with respect to the outer panel. A problem in achieving this relationship arises because of the fact that in assembling the inner and outer panels previous to the securing of the header to the inner panel, relatively wide manufacturing tolerances are required. Thus, if the header were subsequently secured in an unvarying relationship with respect to the inner panel, it would bear a variable relationship with respect to the outer panel. Previous methods of overcoming this difficulty have been slow, expensive and laborious, and have included such means as bolting the header to the inner panel with individually selected shims in order to achieve the proper header-to-outer panel relationship.

According to the invention, locating embossments are provided at spaced points on either the inner panel, the header or both. Each of these embossments, which is preferably of frustoconical shape, has a welding nib projection on the outer flat surface thereof. The outer door panel is placed between stops in a jig or fixture, and a movable electrode is forced against the header at each embossement, the inner panel being backed up at these points by fixed electrodes. The movable electrodes are adapted to travel up to stops which have fixed relationships with respect to the stops between which the outer panel is located. Because of their high current density, the welding nibs will become heated quickly to the weldable temperature range, thereby affixing the two parts. The embossments, because of their lower current density, will be heated only to the plastic range, and continued travel of the movable electrodes will cause the embossments to partially collapse an amount dependent upon the travel of the movable electrodes before they engage their respective stops. Upon cooling, the header will thus be secured to the inner panel in a position which has a fixed relationship with respect to the outer panel.

Referring more particularly to the drawings, FIGURES 1, 2 and 3 show a front door generally indicated at 11 which comprises an inner panel 12, an outer panel 13 and a header or window frame 14. This door is adapted to be assembled in a motor vehicle adjacent a front fender shown partially in dot-dash lines at 15 and a front pillar 16 which bears a fixed relationship with respect to the front fender. Under conventional practice, the inner panel is made up of one or more parts which are preassembled and then secured to the outer panel. As seen in FIGURE 3, inner panel 12 has a front jamb portion 17 and a rear jamb portion 18. The securing of the inner to the outer panel is normally accomplished by clinching the edges of the outer panel over the edges of the inner panel, as seen in FIGURE 3. More specifically, front edge 19 and rear edge 21 of the outer panel are clinched over the adjacent edges of front jamb portion 17 and rear jamb portion 18. An examination of FIGURE 1 will reveal that it is necessary for front edge 19 of outer panel 13 to bear a fixed relationship with respect to rear edge 22 of fender 15 and that rear edge 21 of the door bear a fixed relationship with respect to the front edge 23 of a rear door shown in dot-dash lines 24.

After assembling the inner and outer door panels, header 14 is secured to the inner surfaces of jamb portions 17 and 18, as seen in FIGURE 3. After the door is completed, front edge 25 of header 14 must bear a fixed relationship to rear edge 26 of pillar 16, as seen in FIGURE 1. Similarly, rear edge 27 of the header must bear a fixed relationship to the front edge 28 of a member shown partially in dot-dash lines 29, which may be the center pillar of the vehicle.

Because of inevitable variations in the distance between front jamb portion 17 and front door edge 19, and between rear jamb portion 18 and rear door edge 21, it becomes difficult to achieve the proper location of header 14 with respect to the parts described above. These variations are due to the fact that inner panel 12 is normally built up of several components and is then assembled to the outer panel by a clinching process.

In practicing the invention, the assembly comprising inner panel 12 and outer panel 13 is placed in a jig or fixture which has locating stops shown schematically at 31 and 32 for front edge 19 and rear edge 21 respectively. The distance between these two edges will of course be constant for all doors since edges 19 and 21 are both on outer panel 13. Header 14 is then secured to the inner surfaces of jamb portions 17 and 18 by projection welding, utilizing a novel arrangement which permits this header to be accurately located with respect to edges 19 and 21.

More specifically, a plurality of locating embossments 33 are formed on the lower portions 34 of header 27 which are to be secured to jamb panels 17 and 18. One of these embossements is shown in detail in FIGURE 4, the embossments being of tapered or frustoconical shape and pressed outwardly from the sheet metal comprising header portions 34. The height of embossments 33 will be determined by the maximum manufacturing tolerance which is permitted for the distance between jamb portion 17 and edge 19, or that for the distance between jamb portion 18 and edge 21. In a typical installation, this tolerance is about 1/16", in which case the height of embossments 33 maybe about 1/8", so that sufficient leeway for the securing operation will be permitted, as described below.

Formed on the outer flat surface 35 of each embossment 33 is a relatively small projection or nib 36 which is used for the actual welding between header portions 34 and jamb portions 17 or 18. The height of nib 36 will be determined by the metal thickness being welded, in accordance with standard projection welding procedures. A fixed electrode 37 and a movable electrode 38 are provided for welding embossments 33 to jamb portions 17 and 18. These electrodes are shown only schematically but may be of any conventional character, and more particularly may be arranged so that the several embossments on the front and rear ends of header 14 may be simultaneously or successively welded. As seen schematically in FIGURE 1, each movable electrode 38 is of a positive displacement type, that is, it is adapted to move up to a stop 39 which is fixed with respect to the jig or fixture on which stops 31 and 32 are secured. It will thus be seen that when movable electrodes 38 reach their final or home position, the workpiece portions which these electrodes engage will bear a fixed relationship with respect to front and rear edges 19 and 21 respectively of the door.

In operation, we will assume an initial condition in which inner and outer panels 12 and 13 have been assembled, and that this assembly has been placed between locating stops 31 and 32. We will also assume that a number of spaced-apart embossments 33 have been formed on the lower portions 34 of the front and rear ends of header 14, and that the header has been placed in position to be welded, with these embossments in opposed relation with jamb portions 17 and 18. In order to secure header 14 to the door assembly, movable electrodes 38 will be forced against the undersides of embossments 33. Welding current will be applied between electrodes 37 and 38, and because of the relatively high current density at nibs 36, the material in this area will be quickly heated to its weldable temperature range. This will bring flat surfaces 35 into contact with the jamb portions, increasing the area of electrical contact. Continuance of the welding current will cause embossments 33 to become heated, but since the current density in the embossments is relatively low, they will only be heated to the plastic range. This will permit electrodes 38 to continue their movement until they reach the pre-set limit of their travel as determined by stops 39. During this movement the embossments will be deformed, and the amount of this deformation will depend upon the length of travel of electrodes 38. This in turn will be controlled by the initial distances of jamb portions 17 and 18 from edges 19 and 21, which as stated previously will vary within the tolerance limits of the assembly. For example, if jamb portion 17 is a relatively great distance from edge 19 of the door, embossments 33 at the forward end of header 14 will be deformed a comparatively large amount before electrodes 38 engage stops 39. On the other hand, if portion 17 should be relatively close to edge 19, within the tolerance limits encountered, little or no deformation of embossments 33 will take place. It should be noted that the frustoconical shape of embossments 33 will facilitate their deformation to the extent required.

After these steps have been carried out, the welding current will be shut off and movable electrodes 38 withdrawn. Cooling of the metal in the area of the embossments will thus result in header 14 being firmly secured to the door assembly. It should be noted that since embossments 33 will have been heated to their plastic state, there will be a negligible spring-back which might affect the location of header 14. It should also be observed that because of its shape and relatively small cross-sectional area, header 14 will readily undergo the slight deformation which may be necessary in order to secure the header to the door assembly.

It will thus be seen that an improved construction and method have been provided for accurately securing parts, without the necessity of laborious shimming or other operations. Because of its nature, the system is compatible with accepted projection welding techniques such as will assure sound connections between the parts, and is especially adapted for high production procedures.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:
1. In a method for welding together two sheet metal parts so that a predetermined relationship will exist between the parts, the steps of forming an embossment on one of said parts having an outermost portion and a main portion, placing the outermost portion of said embossment against said second part, applying a pair of welding electrodes to the outsides of said parts adjacent said embossment, forcing said electrodes together so as to apply pressure to at least a portion of said one part outside the recess formed in it by said embossment, applying a welding current between said elec- trodes, causing the outermost portion of said embossment to be heated by said current to a weldable temperature range and the main portion of said embossment to a plastic temperature range, and compressing the main portion of said embossment until said electrodes reach a predetermined spacing.

2. In a method for welding together two sheet metal parts so that a predetermined relationship will exist between the parts, the steps of forming an embossment on one of said parts having an outermost portion and a main portion, placing the outermost portion of said embossment against said second part, applying a pair of welding electrodes to the outsides of said parts adjacent said embossment, forcing said electrodes together so as to apply pressure to at least a portion of said one part outside the recess formed in it by said embossment, applying a welding current between said electrodes, causing the outermost portion of said embossment to be heated by said current to a weldable temperature range and the main portion of said embossment to a plastic temperature range, providing a fixed stop for the final spacing of said electrodes, and compressing the main portion of said embossment until said electrodes reach said final spacing.

3. In a method for welding together first and second sheet metal parts so that a predetermined relationship will exist between the parts, the steps of forming a frustoconical embossment on one of said parts having an outer surface, forming a relatively small welding nib on said outer surface of said embossment, placing said nib against said second part, applying a pair of welding electrodes to the outsides of said parts adjacent said embossments, forcing said electrodes together so as to apply pressure to at least a portion of said one part outside the recess formed in it by said embossment, applying a welding current between said electrodes, causing said nib to be heated to a weldable temperature range and said frustoconical embossment to a plastic temperature range, and compressing said frustoconical embossment until said electrodes reach a predetermined spacing.

4. In a method for securing a first part to a second part so that the first part will bear a fixed relationship to a third part previously attached to the second part, the steps of fixedly positioning the third part, providing an embossment on one of the other two parts having an outer portion engaging the remaining part, heating said outer portion to a wieldable temperature range, heating the main portion of said embossment to a plastic temperature range, and deforming said embossment an amount dependent upon the desired relationship between said first and third parts.

5. In a method for securing a first part to a second part so that the first part will bear a fixed relationship to a third part attached to the second part, the steps of fixedly positioning the third part, providing an embossment on one of the other two parts with a relatively small welding nib on the surface of said embossment facing the remaining part, placing fixed and movable welding electrodes on the outsides of said other two parts adjacent said embossment, applying welding current to said electrodes, and moving said movable electrode to a stop which is fixed with respect to the position of said third part.

6. In a method for securing a relatively flexible first part to a relatively rigid second part so as to have a fixed relationship with respect to a relatively rigid third part, the third part being previously attached to the second part with a relationship which is variable within a predetermined tolerance range; the steps of positively locating said third part, forming an embossment on one of the other two parts having a relatively small welding nib on the surface thereof facing the remaining part, the height of said embossment being at least as great as said tolerance range, engaging the outsides of said first and second parts adjacent said embossment with fixed and movable electrodes, the movable electrode engaging said first part, applying a welding current between said electrodes, and moving said movable electrode to a position fixed with respect to the third part location, whereby said welding nib will be heated to a weldable temperature range and said embossment will be heated to a plastic temperature range and will be deformed an amount dependent upon the relationship between said second and third parts.

7. In a method for securing a window frame of generally inverted U-shape to the jamb portion surfaces of an automobile door so as to have a fixed relationship with respect to the front and rear edges of the door, the steps of positively locating said front and rear door edges, providing a plurality of embossments on the lower portions of the front and rear ends of the window frame with relatively small welding nibs on the outer surfaces of said embossments, providing fixed electrodes on the outsides of said jamb portions and movable electrodes engaging said window frame adjacent said embossments, applying welding current between said electrodes, and moving said movable electrodes toward positions fixed with respect to the locations of said front and rear door edges, whereby said welding nibs will be heated to a weldable temperature range and said embossments will be heated to a plastic range and will be deformed an amount dependent upon the relationship between said jamb portions and said door edges.

8. In an apparatus for welding a first part to a second part so as to have a fixed relationship with respect to a third part, the third part being attached to said second part within a predetermined tolerance, a locating stop for said third part, a tapered embossment formed on one of the other two parts and facing the remaining part, the height of said embossment being at least equal to said predetermined tolerance, a relatively small welding nib on the outer surface of said embossment, fixed and movable electrodes on the outsides of said first two parts adjacent said embossment, and a locating stop for said movable electrode, said locating stops being fixed relative to each other.

9. In an apparatus for welding a window frame of generally inverted U-shape to the jamb portions of an automobile door, locating stops for the front and rear edges of the door, a plurality of tapered embossments on the lower ends of said window frame facing said jamb portions, relatively small welding nibs on the outer surfaces of said embossments, fixed electrodes on the outsides of said jamb portions, movable electrodes engageable with said window frame adjacent said embossments, and stops for locating the final positions of said movable electrodes, said last-mentioned stops being fixed with respect to the locating stops for said front and rear door edges.

10. The combination according to claim 9, the relationship between said jamb portions and said door edges having a predetermined tolerance, the height of said embossments being at least equal to said tolerance.

11. In a construction for welding together first and second sheet metal parts so as to have a fixed relationship therebetween, an embossment formed on said first part and extending toward said second part, a relatively small welding nib formed on the outer surface of said embossment, an annular surface on said first part at the base of said embossment adapted to be engaged by a first welding electrode, a surface on said second part opposite said embossment adapted to be engaged by a second welding electrode, the relative cross-sectional areas of said embossment and nib being such that heating of said nib only to a weldable temperature range by a welding current of just sufficient magnitude to achieve said range passing through said embossment and nib will cause said embossment to be heated to a plastic temperature range, a first welding electrode engageable with said annular surface, the outer end of said first welding electrode being so shaped as to be in non-engaging relation with the interior of said embossment when said first welding electrode engages said annular surface, and a stop position in the path of movement of said first electrode when forced against said annular surface so as to achieve said fixed relationship.

12. In a construction for welding together first and second sheet metal parts so as to have a fixed relationship therebetween, an embossment formed on said first part and extending toward second part, said embossment being of frustoconical shape, of substantial depth and having a flat top, a relatively small welding nib formed on the outer surface of said embossment, an annular surface on said first part at the base of said embossment adapted to be engaged by a first welding electrode, a surface on said second part opposite said embossment adapted to be engaged by a second welding electrode, the relative cross-sectional areas of said embossment and nib being such that heating of said nib only to a weldable temperature range by a welding current of just sufficient magnitude to achieve said range passing through said embossment and nib will cause said embossment to be heated to a plastic temperature range, a first welding electrode engageable with said annular surface, the outer end of said first welding electrode being so shaped as to be in non-engaging relation with the interior of said embossment when said first welding electrode engages said annular surface, and a stop positioned in the path of movement of said first electrode when forced against said annular surface so as to achieve said fixed relationship.

13. In a construction for welding a first part to a second part so as to bear a fixed relationship with respect to a third part, the third part being attached to the second part within a predetermined tolerance, a tapered embossment formed on one of the first two parts, the height of said embossment being at least equal to said predetermined tolerance, a relatively small welding portion formed on the outer end of said embossment, an annular surface formed on said one part at the base of said embossment and adapted to be engaged by a first welding electrode, a surface on the other of said first two parts adapted to be engaged by a second welding electrode, the relative cross-sectional areas of the welding portion and main portion of said embossment being such that passage of welding current through said welding and main portions just sufficient to heat the welding portion only to a weldable temperature range will cause heating of said main portion of the embossment to a plastic temperature range, a first welding electrode engageable with said annular surface, the outer end of said first welding electrode being so shaped as to be in non-engaging relation with the interior of said embossment when said first welding electrode engages said annular surface, and a stop positioned in the path of movement of said first electrode when forced against said annular surface so as to achieve said fixed relationship.

14. A method for securing a first part to a second part so that the first part will bear a fixed relationship to a third part attached to the second part, the steps of fixedly positioning the third part, providing an embossment on one of the other two parts facing the remaining part, placing fixed and movable welding electrodes on the outsides of said other two parts adjacent said embossment, applying welding current to said electrodes, and moving said movable electrode to a stop which is fixed with respect to the position of said third part, so as to apply pressure to at least a portion of said one part outside the recess formed in it by said embossment.

15. In a method for securing a relatively flexible first part to a relatively rigid second part so as to have a fixed relationship with respect to a relatively rigid third part, the third part being previously attached to the second part with a relationship which is variable within a predetermined tolerance range; the steps of positively locating said third part, forming an embossment on one of the other two parts, the height of said embossment being at least as great as said tolerance range, engaging the outsides of said first and second parts adjacent said embossment with fixed and movable electrodes, the movable electrode engaging said first part, applying a welding current between said electrodes, and moving said movable electrode to a position fixed with respect to the third part location, whereby the outer portion of said embossment will be heated to a weldable temperature range and the main portion of said embossment will be heated to a plastic temperature range and will be deformed an amount dependent upon the relationship between the second and third parts.

References Cited in the file of this patent

UNITED STATES PATENTS 1,020,056     Rietzel _____ Mar. 12, 1912